June 13, 1944.  A. P. ANDERSON  2,351,313
THERMOSTATIC EXPANSION VALVE
Filed Sept. 16, 1941
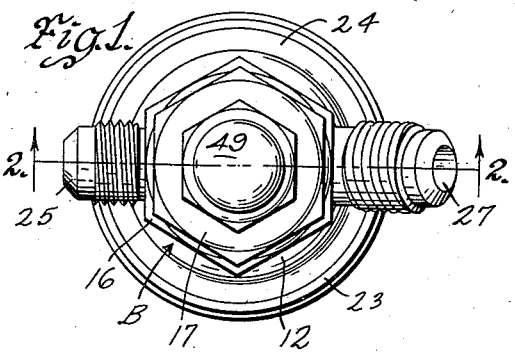
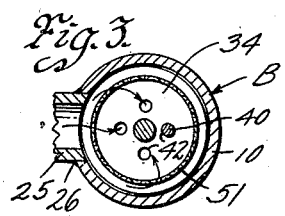
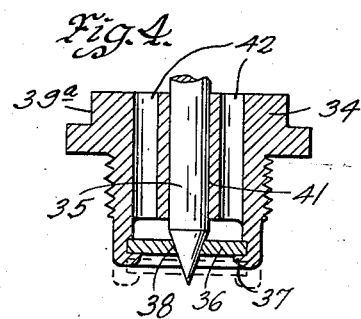
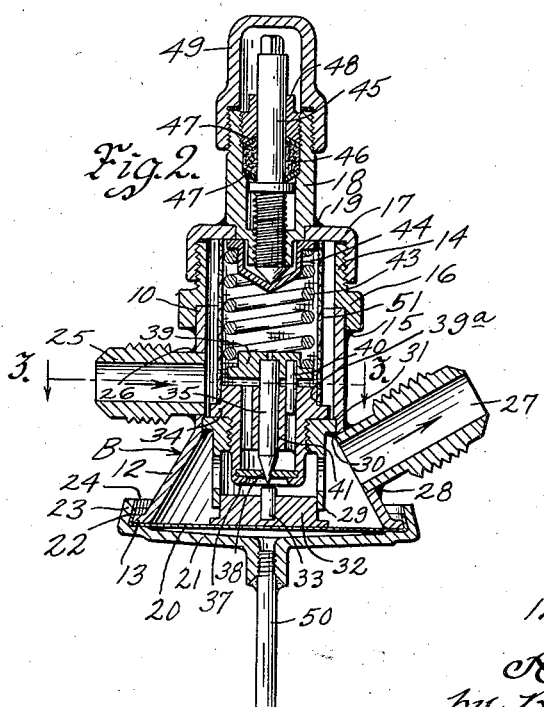
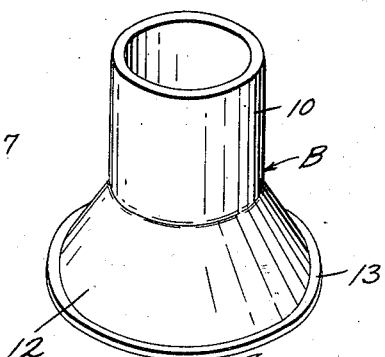
Inventor
August P. Anderson
by Baiv & Freeman
Attys Patented June 13, 1944

2,351,313

UNITED STATES PATENT OFFICE 2,351,313

THERMOSTATIC EXPANSION VALVE

August P. Anderson, Goshen, Ind., assignor to Penn Electric Switch Co., Goshen, Ind., a corporation of Iowa Application September 16, 1941, Serial No. 411,023

4 Claims. (Cl. 137—153)

My invention relates to an expansion valve such as used in refrigerating systems and wherein pressure changes resulting from temperature changes act upon a diaphragm to automatically regulate the expansion valve.

One object of my invention is to provide an expansion valve which eliminates the necessity of a cast metal body and instead uses a body which may be formed of a sheet metal stamping, to which various elements of the expansion valve may be brazed or otherwise suitably connected in sealed relation thereto.

Another object is to provide an expansion valve wherein a valve unit including a member having the valve seat therein and a needle valve for coaction therewith are removable as a unit and so interchangeable with other such units that the capacity of the valve may be readily changed thereby.

Still a further object is to provide a valve body which may be formed of a stamping and therefore eliminates the necessity of machining and at the same time eliminates the possibility of weaknesses developing by voids or porosity, as in a cast body; also making it possible to produce an expansion valve at considerably less cost than where a cast body is provided.

Another object is to provide a needle valve with guide means to prevent its rotation relative to a valve seat, thereby insuring proper seating of the valve needle at all times.

Still another object is to provide the valve unit so designed as to accommodate a screen or filter of cylindrical type so arranged that a relatively large area communicates with the inlet fitting to substantially reduce service calls for the purpose of cleaning the filter.

Other objects are to make provision for adjusting the valve as found necessary and for permitting an interchange of valve units to vary the capacity of the valve by replacing certain minor parts thereof, instead of having to install a new valve of different size altogether.

With these and other objects in view, my invention with respect to its features which I believe to be novel and patentable will be pointed out in the claims appended hereto. For a better detailed understanding of the invention, and further objects relating to details of economy of my invention, reference is made to the following description and to the accompanying drawing, wherein such further objects will definitely appear and in which Figure 1 is a plan view of a thermostatic expansion valve embodying my invention;

Figure 2 is a vertical sectional view on the line 2—2 of Figure 1;

Figure 3 is a sectional view on the line 3—3 of Figure 2;

Figure 4 is an enlarged sectional view of a portion of Figure 2 showing different sizes of valve seat installations, and Figure 5 is a perspective of a valve body of the stamped sheet metal kind that I provide.

On the accompanying drawing, the reference character B indicates generally the valve body. The body B is formed of a heavy sheet metal stamping having the cylindrical part 10, a truncated cone-shaped part 12 and an outwardly extending flange 13. On the upper end of the cylindrical part 10 a threaded extension sleeve 14 is brazed or soldered as at 15 and has a polygonal-shaped portion 16 with which a wrench may be associated. A removable head 17 is threaded on the sleeve 14 and a sleeve 18 of reduced size is in turn brazed or soldered as at 19 to the head 17.

On the lower or cone-shaped part 12 of the body B, a diaphragm 20 is mounted to span the open end, and a diaphragm casing 21 encloses the diaphragm. The diaphragm itself has an upwardly turned peripheral flange 22 spun to incline upwardly and inwardly, as illustrated in Figure 2, and likewise the casing 21 has a peripheral flange 23 bent upwardly and inwardly. The parts 12, 13, 22 and 23 are then sealed with relation to each other as by brazing or soldering indicated at 24.

An inlet fitting 25 is brazed or soldered at 26 to the cylindrical portion 10 of the body B. An outlet fitting 27 is similarly connected at 28 to the cone-shaped portion 12 of the body B. Within the body a diaphragm guide 29 is mounted and sealed relative to the body by brazing or soldering indicated at 30. The guide 29 seats against a shoulder 31 formed in the stamping B.

The guide 29 has a downwardly extending tubular part 31 to guide a diaphragm follower 32. The follower 32 has an actuating pin 33.

In the valve body B is a valve unit consisting of a body element 34 and a needle element 35. The body element 34 carries a valve disc 36 mounted against a shoulder and sealed relative to the body 34 by the lower edge spun or peened over the edge of the disc 36, as indicated at 37. The disc 36 is pierced by a valve seat 38. The needle 35 is adapted to seat thereagainst.

The valve unit further includes a head 39 for the needle 35, the needle being pressed thereagainst and a guide pin 40 also pressed into the head 39. The needle 35 is guided in a bore 41 of the body element 34, while the guide pin 40 is slidable in one of a plurality of openings 42 thereof. The other openings 42 are designed to permit passage of fluid as indicated by the arrows in Figure 3.

The valve head 39 is backed by a spring 43 which in turn engages a cup-shaped spring follower 44 adjusted as to position by a range adjusting screw 45. The screw 45 is threaded in the sleeve 18 and is packed relative thereto by packing indicated at 46 confined by washers 47 in the sleeve 18 and by a packing gland 48. A removable cap 49 is provided for gaining access to the range adjusting screw 45.

*Practical operation*

In the operation of my expansion valve, the needle 35 is normally seated by the spring 43. It is automatically opened by predetermined pressure entering from a capillary tube 50 into the diaphragm casing 21. The tube 50 of course goes to the usual capillary bulb located generally at the outlet end of the evaporator coil. Predetermined pressure in the diaphragm casing will cause the pin 33 to engage the lower end of the needle 35 and thereby unseat it against the bias of the spring 43.

My valve structure is designed for economy of manufacture, particularly with respect to the formation of the valve body of a stamping that eliminates the necessity of machining. Various parts required in connection with the body to make up the entire valve structure may be conveniently brazed or soldered to the body member. The valve unit consisting of the elements 34, 35, 36, 39 and 40 may be interchanged to vary the capacity of the valve by substituting, as shown in Figure 4, a unit wherein the disc 36 is mounted closer to the body element 34 than as shown in Figure 2 (see dotted lines in Figure 4). The valve seat of the disc is accordingly higher with relation to the cone-shaped lower end of the needle 35 and therefore of greater diameter. However, the lower end of the needle 35 assumes the same position in the valve body with respect to the actuating pin 23. Several different sizes may be accommodated in this manner with the same size of valve body.

The guide pin 40 serves as an effective means to prevent rotation of the needle 35 with relation to the seat 38, thus resulting in the needle always seating in the same relation to the valve seat and thereby eliminating leakage as caused in those types of valves where the needle is free to rotate to any position.

The foregoing advantages make for the fabrication of an expansion valve at very low cost and provide a ready means for changing the capacity to suit different installations.

A screen type filter in cylindrical form is indicated at 51. This screen surrounds a shouldered part 34ª of the body element 34 and provides a cylindrical space between the screen and the interior surface of the cylindrical part 10 of the body B to communicate with the inlet fitting 25. Thus, considerable area is presented to minimize the possibility of clogging and of service calls for the purpose of cleaning the screen.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a thermostatic expansion valve, a body member, a diaphragm therein, a diaphragm guide mounted in said valve body, a diaphragm follower guided thereby, a valve unit in said valve body comprising a body element having removable screw-threaded connection with said diaphragm guide and a plurality of openings therein, said valve unit including a valve pin slidable in one of said openings, a guide pin slidable in another of said openings and a head connecting said pins together, said body element having a shouldered part, and a valve disc mounted therein and provided with a valve seat for coaction with said valve pin, the annular marginal edge of said body element being bent over the peripheral edge of said valve disc to retain the disc in position relative to said body element.

2. In a thermostatic expansion valve, a body having inlet and outlet fittings connected thereto, a valve unit therein comprising two parts, one of said parts being removably threaded within said valve body and having a plurality of openings vertically therethrough and having a tubular extension, a horizontally arranged valve disc having a valve seat, said disc having its peripheral edge supported in an annular groove of said extension, the other of said parts having a valve head member, a needle valve element slidable in one of said openings and a guide pin slidable in another of said openings, diaphragm means associated with said valve body for actuating said needle valve element in accordance with pressures affecting said diaphragm, and range adjusting means for said valve unit and operable from the exterior thereof.

3. In a thermostatic expansion valve, a body member, including a cone-shaped portion having an outlet opening therein, a diaphragm at the large end of the cone, a valve unit in said valve body comprising a body element having a plurality of openings therein, said valve unit including a valve pin slidable in one of said openings, a guide pin slidable in another of said openings and a head connecting said pins together, said body element having a shouldered part, and a valve disc mounted therein and provided with a valve seat for coaction with said valve pin, the marginal annular edge of said body element being bent over the peripheral edge of said valve disc to retain the disc in position relative to said body element.

4. In a thermostatic expansion valve, a body having inlet and outlet fittings connected thereto, a valve unit therein comprising two parts, one of said parts being removably threaded within said valve body and having a plurality of openings vertically therethrough and a tubular extension, a horizontally arranged valve disc having a valve seat, said disc having its peripheral edge supported in an annular groove of said extension, the other of said parts having a valve head member, a needle valve element slidable in one of said openings and a guide pin slidable in another of said openings, and diaphragm means associated with said valve body for actuating said needle valve element in accordance with pressures affecting said diaphragm.

AUGUST P. ANDERSON.